(12) United States Patent
Barraclough et al.

(10) Patent No.: US 8,199,761 B2
(45) Date of Patent: Jun. 12, 2012

(54) COMMUNICATIONS MULTIPLEXING WITH PACKET-COMMUNICATION NETWORKS

(75) Inventors: Keith Barraclough, Mountain View, CA (US); David Irvine, San Jose, CA (US); Rodrigo Philander, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 1539 days.

(21) Appl. No.: 11/407,697

(22) Filed: Apr. 20, 2006

(65) Prior Publication Data
US 2007/0247395 A1    Oct. 25, 2007

(51) Int. Cl.
H04L 12/28    (2006.01)
(52) U.S. Cl. .................................... 370/395.3; 370/227
(58) Field of Classification Search .......... 370/229–235, 370/395.2, 395.3; 709/226–229, 237
See application file for complete search history.

(56) References Cited

U.S. PATENT DOCUMENTS

| | | | |
|---|---|---|---|
| 4,979,118 A | 12/1990 | Kheradpir | |
| 5,774,660 A | 6/1998 | Brendel et al. | |
| 5,862,325 A | 1/1999 | Reed et al. | |
| 5,920,701 A | 7/1999 | Miller et al. | |
| 6,006,264 A | 12/1999 | Colby et al. | |
| 6,067,565 A | 5/2000 | Horvitz | |
| 6,112,225 A | 8/2000 | Kraft et al. | |
| 6,161,133 A | 12/2000 | Kikinis | |
| 6,167,438 A | 12/2000 | Yates et al. | |
| 6,577,601 B1 | 6/2003 | Wolpert | |
| 6,751,664 B1 | 6/2004 | Kogan et al. | |
| 6,810,037 B1 * | 10/2004 | Kalapathy et al. | 370/392 |
| 6,980,556 B2 | 12/2005 | Vimpari | |
| 2002/0141369 A1 * | 10/2002 | Perras | 370/338 |
| 2002/0174246 A1 | 11/2002 | Tanay et al. | |
| 2003/0149774 A1 | 8/2003 | McConnell et al. | |
| 2003/0224792 A1 * | 12/2003 | Verma et al. | 455/436 |
| 2004/0003132 A1 | 1/2004 | Stanley et al. | |
| 2004/0133692 A1 * | 7/2004 | Blanchet et al. | 709/230 |
| 2004/0190521 A1 * | 9/2004 | Rodin et al. | 370/395.2 |
| 2005/0055577 A1 * | 3/2005 | Wesemann et al. | 713/201 |
| 2005/0220148 A1 * | 10/2005 | DelRegno et al. | 370/498 |
| 2006/0039371 A1 | 2/2006 | Castro et al. | |
| 2006/0062218 A1 * | 3/2006 | Sasagawa | 370/389 |
| 2006/0062242 A1 | 3/2006 | Dacosta | |
| 2006/0092845 A1 * | 5/2006 | Kwan et al. | 370/235 |
| 2007/0121641 A1 * | 5/2007 | Hovey et al. | 370/395.2 |
| 2008/0069116 A1 | 3/2008 | Pong | |

OTHER PUBLICATIONS

Wu et al., Recovery from Control Plane Failures in the CR-LDP and O-UNI Signalling Protocols, Oct. 2003, pp. 139-145.*

* cited by examiner

*Primary Examiner* — Ricky Ngo
*Assistant Examiner* — Kan Yuen
(74) *Attorney, Agent, or Firm* — Mintz, Levin, Cohn, Ferris, Glovsky & Popeo, P.C.

(57) ABSTRACT

A communication link is established with a packet-communications device. According to an example embodiment of the present invention, a network connection is established between the packet-communications and a server to pass data such as requests and responses, as well as files, media, streaming and other data. The network connection is a tunneled connection, facilitating the communication of data using a particular protocol that may be different from or otherwise incompatible with the data being communicated. The tunnel is divided into two or more logical communications channels, facilitating the multiplexing of data (e.g., request/response pairs) onto a single physical network connection.

19 Claims, 6 Drawing Sheets

COMMUNICATIONS MULTIPLEXING WITH PACKET-COMMUNICATION NETWORKS

FIELD OF THE INVENTION

The present invention relates generally to communications and, more particularly, to communications over packet-communicating network such as the internet.

BACKGROUND OF THE INVENTION

Data communications over a variety of networks, such as Internet protocol (IP) networks, mobile telephone networks and others have increased at an astonishing rate over recent years. The affordability and availability of computers, telephones, wireless devices and other network access appliances has made their use prevalent in a variety of applications. Further, as the demand for network access devices has increased, the diversity in types of network access appliances has also increased, with different devices often implementing different protocols and performance-based operational characteristics.

As access to packet-communicating networks such as the Internet and other networks becomes easier, convenient and more readily available, these networks are increasingly used and relied upon for many communication uses. To facilitate this communication, and particularly as the communication becomes more complex and involves greater bandwidth, a great deal of data is passed between devices on these networks. In this regard, the speed, reliability, security and cost of such data transfer continues to increase in importance.

Protocols such as the transmission control protocol (TCP) are used to facilitate communications between packet-communicating devices on these networks. Using protocols such as TCP, a communications link between packet-communicating devices is made for transferring data. Using such protocols, delivery of reliable and ordered data is facilitated and can be effected for concurrent communication with two or more communications applications.

In many instances, data such as images, audio, video and text, as well as application-specific data pertaining to a particular software program, is desirably transferred between network devices. For example, data for computer software, music, video, news services, games and other applications is often requested and delivered via the Internet and, for many applications, via wireless networks such as those implemented for cellular telephone networks. In this regard, the number of network subscribers, data providers, and requests by those subscribers for data transfer, streaming data and other content are growing exponentially. However, the limitations of current systems, in passing the data and otherwise, restrict the ability to meet the demand in a reliable, secure, efficient and affordable manner.

As the electronic storage of content and other data grows in popularity, remote access to the data as well as convenient manners in which to store the data have become increasingly important. For example, many workplaces have become increasingly mobile; employees are often working from a remote location such as at home or at traveling locations. Access to data from remote locations has been particularly useful for facilitating mobility while maintaining a desirable level of access to information. In addition, many personal users of packet-communicating devices use and/or rely upon electronic data such as pictures, audio and video. However, the growing size of data files desirably transferred to facilitate mobility or to otherwise provide flexible data access has presented challenges to the delivery of such data over communications channels. For instance, email is generally limited in its ability to transfer large data files, such as audio, video, text and presentation files.

Effectively and efficiently managing data transfer via communication networks has been challenging in the face of the advancement of technologies and trade channels that use or could use network-based data transfer.

SUMMARY OF THE INVENTION

The present invention is directed to approaches to data routing, management and associated applications, and in particular to the facilitation of communications between a server and registered user's packet-communicating device. The present invention is exemplified in a number of implementations and applications, some of which are summarized below.

According to an example embodiment of the present invention, an approach to data routing involves the establishment of a network connection between a registered data source and a host server. The registered data source contacts the host server to establish a tunneled network connection with multiple logical communications channels that facilitate the multiplexing of communications between the registered data source and the host server. The logical communications channels facilitate the communication of requests and responses between the registered data source and the host server.

According to another example embodiment of the present invention, information is communicated between two packet-communicating devices over a packet-based network using data and control communications channels to pass embedded communications over a communications link. At a first one of the packet-communicating devices, a communications link is initiated with a second one of the packet-communicating devices using a packet-based communications protocol, and a control communications channel with a control channel ID is established in the communications link.

A data communications channel is established in the communications link as follows. At one of the first and second packet-communicating devices, a first communication is sent over the communications link, the first communication being embedded in the packet-based communications protocol and indicating that a channel is to be established. The first communication is received at the other of the first and second packet-communicating devices. A unique channel ID is specified for the indicated channel to be established at one of the packet communicating devices. The established data communications channel is used to pass data by embedding the data, together with information identifying the specified unique channel ID, within the packet-based communications protocol. The embedded data is then passed over the communications link. The established data communications channel is subsequently terminated by passing a channel termination command embedded with the packet-based communications protocol and identifying the specified channel ID.

In another example embodiment of the present invention, a multi-channel tunneled communication link is established between two packet-communicating devices over a packet-based network. A communications link is established between the packet-communicating devices using a protocol amenable to use with the packet-based network. At least two tunneled channels are then established in the communications link as follows (for each channel). At one of the packet-communicating devices, the protocol is used to send information, indicating that a channel is to be established, over the communications link to the other packet-communicating device. The information is received at the other packet-communicating device, and a unique channel ID is specified for the indicated channel to be established. Each tunneled channel is then used to pass a unique data stream by embedding data, together with information identifying the specified unique channel ID for the channel, within the protocol, and passing the embedded data over the communications link. After all data in a unique data stream has been passed, the tunneled channel over which the unique data stream was passed is terminated.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
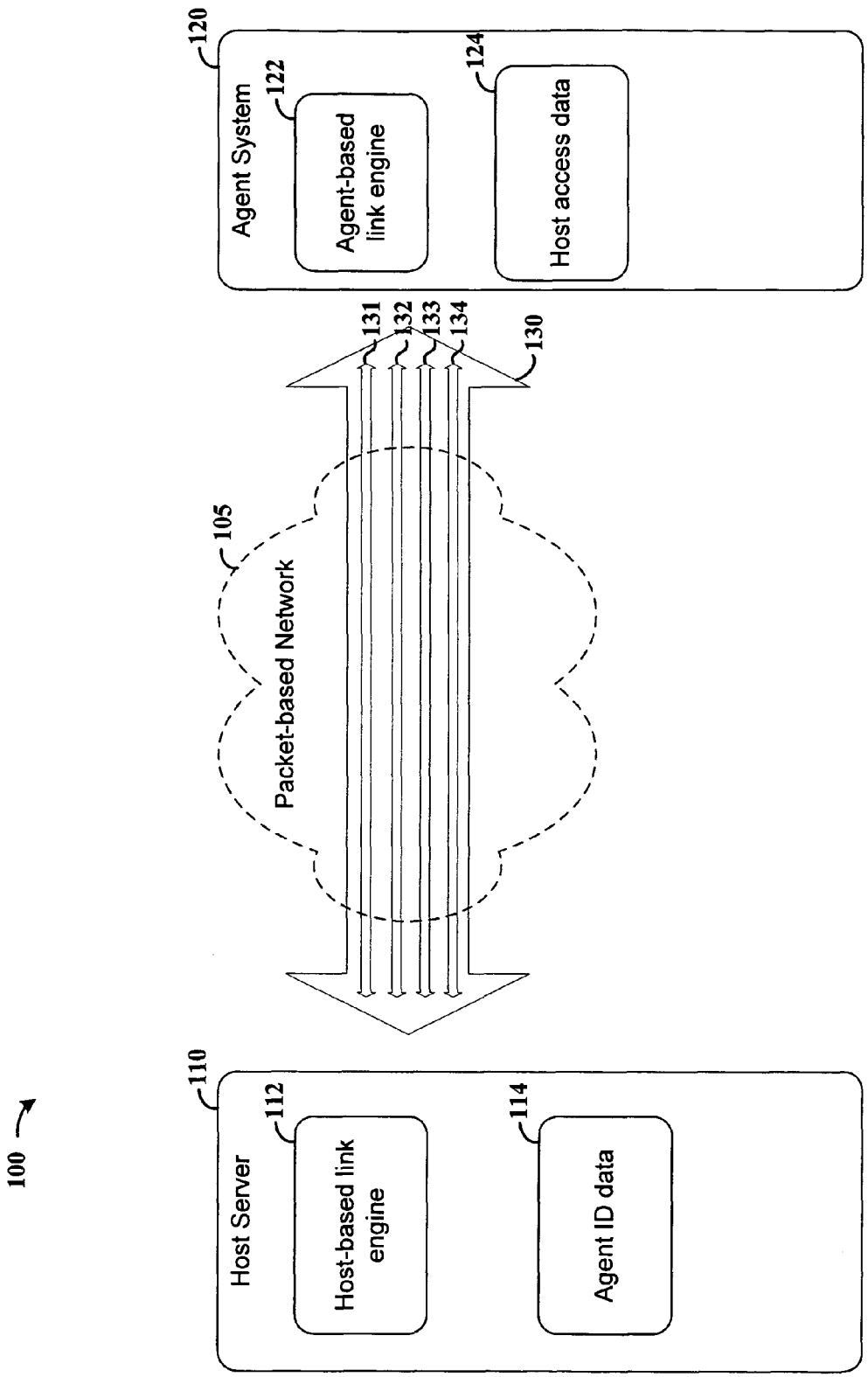
FIG. 1 shows a system and approach for communicating over a packet-based network using a multiplexed tunnel approach, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications, and the invention has been found to be particularly suited for personal data routing on a packet-communicating network such as the Internet. While the present invention is not necessarily limited to such applications, various aspects of the invention may be appreciated through a discussion of various examples using this context.

According to an example embodiment of the present invention, a packet-based tunnel between two packet-communicating endpoint devices (endpoints) is multiplexed to include two or more communications channels within the tunnel. One of the endpoints establishes a tunneled connection to the other by initiating a communication using a protocol associated with the packet-based tunnel. In some applications, one or both endpoints authenticates the other endpoint (i.e., where failure to authenticate results in a rejection of the establishment of the tunneled connection). The packet-based tunnel uses a protocol as appropriate for a particular communications link or links over which data is passed; such communications protocol include, for example, wired or wireless protocols such as those implemented in telephony systems, Internet-based protocols such as TCP, and other protocols implemented with different types of communication approaches.

When one of the endpoints wishes to send a data stream to the other endpoint, the data stream is transmitted on the tunneled connection using a channel having a unique channel ID. Each such stream is assigned a unique channel ID by the endpoint sending the data stream. The data stream is broken into blocks containing the channel ID of the stream and the data to be passed, with each block embedded in the protocol for the packet-based tunnel. In some applications, the channel ID is set by flagging the first block in the stream as the "first block" and specifying a channel ID therein.

The blocks are received and read by the receiving endpoint. When reading a block flagged as the "first block," the receiving endpoint creates a new data stream into which blocks can be written and associates the data stream with the channel ID contained in the initial block. Once a channel ID has been established for a particular data stream (using the first block approach above or otherwise), subsequently-received data blocks for the stream are identified with the channel ID. Each block received by the receiving endpoint is appended to the appropriate data stream using the channel ID. That is, each block received is associated with a particular data stream using the channel ID for that data stream, so that all blocks are appropriately collected for a particular data stream.

The connection established between the endpoints supports the simultaneous transfer of multiple data streams as described above, with each stream using its own channel (having a unique channel ID). When multiple data streams are sent, one or more blocks are written to the tunnel in turn.

In some applications, the number of blocks written for a particular channel and/or by a particular endpoint device is selectively governed. In one application, the number of blocks written is selectively governed using a programmed algorithm. The algorithm uses a simple round-robin between data streams, such that the streams share the available bandwidth on the tunnel evenly. In other applications, the algorithm facilitates other approaches, such as those using priority-based transfer, unequal or otherwise dynamic sharing of available bandwidth. For example, the initiation of a relatively higher-priority data transfer may trigger the pausing of a lower-priority data transfer already in progress, with the lower-priority data transfer resumed upon completion of the higher-priority data transfer and/or upon availability of higher bandwidth. In addition, for certain types of communications, a selected amount of bandwidth is selectively maintained to facilitate a particular quality associated with the transfer of the data. These functions are selectively carried out using the control channel and managed by one or both endpoint devices and/or a server on the network in communication with an endpoint device (in some applications, one of the endpoints is the server).

In the context of the above and other description herein, the packet-based tunnel, or communications channel, between two endpoint devices can be implemented using different protocols depending upon the application. One example approach involves the establishment of a packet-based tunnel in the context of a user's home computer connected to the Internet via a modem and an Internet service provider, with the tunnel connecting the user with a server on the Internet. The tunnel may be associated with a communications approach similar to approaches involving a user at the home computer communicating data with the server over the Internet, with the data embedded in an Internet protocol that facilitates the communication of the data. This protocol further facilitates contact between the server and the user's home computer, for example, where the home computer is not publicly addressable (i.e., the user's home computer initiates the communication and, via the protocol, the server can communicate information back to the user's home computer via the tunneled connection).

According to another example embodiment of the present invention, communication software implemented at a registered data source establishes a multi-channel tunneled network connection between the registered data source and a host server. The registered data source includes, for example, a personal computer or other packet-communicative device that is coupled to a packet-communicating network such as the Internet. The communication software contacts the host server to establish the network connection. Once established, the host server uses the tunneled network connection to communicate with the registered data source to facilitate one or more of a variety of network-communicative approaches, such as those involving the routing of data to and/or from the registered data source. With this approach, two or more logical channels can be established via the tunneled connection, facilitating the multiplexing of request/response communication pairs (e.g., HTTP request/response pairs) in a single tunneled connection (e.g., a TCP connection) and mitigating latency associated with the creation of additional network connections. That is, more than one request/response pair can pass through the connection during a particular time, such that a single request/response pair does not necessarily occupy the connection until the entire response is received.

The multi-channel tunneled network approach is implemented with different physical components, programming and protocols depending upon the application, working to tunnel multiple channels over a single network connection. In one application, the client browser provides access to a remote user for selecting data for transfer, such as by making a web page or other interactive tool available to the user via a packet-based network. The agent gateway controls access to a data source and the transfer of data therefrom (i.e., acts as a gateway to the data source). The agent facilitates communications at the data source and a tunneled connection to the agent gateway.

In some applications, the registered data source is a non-publicly-addressable device or otherwise protected from access, such that the host server is unable to initiate communications with the registered data source until the multi-channel tunneled network connection is established. For instance, where a registered data source is located at a registered user's home and coupled to the Internet via a modem or other common device, the registered data source is generally not publicly addressable. Similarly, certain hardware such as NAT (network address translation) hardware and/or software such as firewall software can inhibit such access. In this regard, the registered data source initiates the creation of a persistent network connection (e.g., for a period of time and/or until the connection is broken) to the host server. Once the registered data source establishes the network connection with the host server, the host server can then initiate communications with the registered data source via the established network connection.

In some applications, the communication software at the registered data source automatically establishes the multi-channel tunneled network connection with the host server upon startup or other initiation condition. One such approach is directed to an automated sign-in upon power-up of a registered user's personal computer (programmed with the communication software). When the registered user turns on his or her personal computer, the software automatically contacts the host server and facilitates the establishment of a tunneled connection.

According to an example embodiment of the present invention, a peer-to-peer network routing system is configured for selectively communicating data between a data source and a user at a remote packet-communicating device via which the user has been granted access to the data source. The data source typically includes, e.g., a personal computer, set top box, web camera, secure monitoring system and/or data storage system at a home or business location with network (e.g., Internet) access. In this context, a "user" at a remote packet-communicating device may include one or more individuals, such as members of a household, employees of a business entity or simply an individual given access authorization by a user associated with the data source. Further, a "user" may be a machine automatically functioning, e.g., as programmed by an individual.

A host server provides a personal network service that connects a user, with software implemented at a data source, to data available at the data source. The host server facilitates an intelligent interface accessible by the remote packet-communicating device and further facilitates the selection and delivery of data, such as audio, image or video data, from the data source to the remote packet-communicating device. A user at the remote packet-communicating device is thus connected to a data source in the sense that the user can receive information stored at the data source, directly and/or via the host server.

Communications with the data source and the host server (or directly with a remote packet-communicating device) are facilitated with a tunneled network approach as discussed above. Multiple logical channels as established over a particular tunneled connection facilitate the processing of different data request/response pairs. For instance, when a user at a remote packet-communicating device requests data from the data source via the intelligent interface, associated request/response pairs are passed over the tunneled link for controlling the data source for routing data therefrom.

Remote access to data at the data source (e.g., via the intelligent interface) is controlled by the host server using one or more of a variety of approaches, such as with user-specific authorization information and/or by identifying a particular remote packet-communicating device from which access is requested. Where user-specific criteria, such as identification (e.g., user name) and security code (e.g., a password) are used, this information may be stored at a remote packet-communicating device and automatically provided to the host server, at the host server (or elsewhere on the network) or input by a user at the remote packet-communicating device.

Where identification characteristics specific to a remote packet-communicating device are used, such identification information is provided by the remote packet-communicating devices to the host server. For instance, where the remote packet-communicating device includes a mobile telephone, the telephone number of the mobile telephone may be used to grant access to data at the data source. Other identifiers can also be used to grant access, such as a user identification number of a mobile device, an IP address, location or combination of such information. In other applications, a combination of identification information specific to a remote packet-communicating device and user-specific criteria (e.g., a device ID plus user name and password) are used in controlling access to data at the data source.

In some applications, the delivery of data such as media content to a remote packet-communicating device involves the configuration of the content into a format that is amenable to delivery to and/or use at the remote packet-communicating device. For example, where a remote packet-communicating device is capable of displaying images in a particular format, images requested by the remote packet-communicating device are formatted so that the remote packet-communicating device can display the images. In addition, where data transfer rate is limited by available connections (bandwidth), images are selectively formatted so that each images requires a relatively lesser amount of data (e.g., high resolution images are formatted to a lower resolution to reduce image data size, prior to transfer). As another example, when audio data such as music is requested and the remote packet-communicating device is adapted for playing audio data in a particular digital audio format (e.g., mp3 format), requested audio data is formatted into the particular digital audio format prior to communication to the remote packet-communication device via the tunneled link.

Turning now to the Figures, FIG. 1 shows an arrangement 100 for communicating over a packet-based network 105 such as the Internet, using a multi-channeled tunnel link 130 between a host server 110 and each of a plurality of registered user computer devices, according to another example embodiment of the present invention. For brevity, only one computer device is shown, as agent system 120.

The host server 110 includes a host-based link engine 112 and agent ID data 114 that characterizes agent systems such as agent system 120. The host server 110 uses the agent ID data 114 to identify agent systems that contact the host server for establishing a tunneled communications link therewith. In some embodiments, the host server 110 is implemented in a distributed manner with a plurality of separate host devices (e.g., computer-implemented host link engines) each having access to agent ID data and collectively making up the host server 110. Once the multi-channeled tunnel link 130 is established between the host server 110 (or an instance thereof) and the agent system 120, the host serer can facilitate one or more of a variety of communications with the agent system and, in certain embodiments, with other systems external to the host server.

The agent system 120, as with other agent systems communicating with the host server 110 as appropriate, includes an agent-based link engine 122 and host access data 124 that facilitates the identification of the host server and/or otherwise facilitates communication with the host server 110 for establishing the multi-channeled tunnel link 130.

When a network link is to be established, the agent-based link engine 122 uses the host access data 124 to identify and communicate with the host server 110 over the packet-based network 105, to initiate the multi-channeled tunnel link 130. Generally, this approach facilitates an initial communication with the host server 110 to enable a link between the host server and the agent system 120 without the agent system necessarily being publicly addressable. For example, where the packet-based network 105 is the Internet, this agent-initiated approach facilitates communications from the host server 110 to the agent system 120 without the agent system having its own IP address (i.e., such that the agent system is not addressable).

Once the host sever 110 receives the initial communication from the agent-based link engine 122, the host-based link engine 112 uses the agent ID data 114 to verify that a link can be established with the agent system 120 and returns a communication to the agent-based link engine, facilitating the establishment of the multi-channeled tunnel link 130.

In some applications, the agent system 120 uses a single SSL connection to facilitate the multi-channeled tunnel link 130. SSL termination is provided as a function of a network appliance, generally reducing the overhead on the hardware when compared to multiple connections per agent. A single TCP connection is thus used for many requests/responses, such that the consumption of system resources such as file handles, socket buffers and port numbers is reduced, relative to using multiple such connections. Furthermore, usage of the single TCP connection is less volatile when compared to the construction/destruction of many short-lived TCP connections (i.e., when multiple such connections are made).

Generally, the multi-channeled tunnel link 130 is established using a communications protocol amenable to use with the packet-based network that allows the host-based link engine 112 to send information to the agent system 120 in a manner that complies with protocol or other requirements of the packet-based network 105. For instance, where a particular protocol is used to communicate over the packet-based network, each packet is communicated in accordance with this protocol. These packets also have information that is used to facilitate desired communications between the host server 110 and the agent system 120, such as for controlling the routing of data from the agent system at the direction of the host server.

Two or more of the multiple channels 131, 132, 133 and 134 are selectively established to facilitate different channels over which communications are passed between the host server 110 and the agent system 120. Each channel can be used to pass request/response pairs and/or other related information between the host server 110 and the agent system 120. For instance, when the agent system requests information from the host server, such as information characterizing historical communications between the agent system and the host server or agent ID data, and that request is sent over channel 131, a response to that particular request is sent from the host server over the same channel.

Similarly, the host server 110 may send a request to the agent system 120 (i.e., after the agent system 120 has initiated communications), such as to retrieve data from the agent system 120. The request is sent over a particular channel such as channel 132, and the response (e.g., return of requested data) from the agent system 120 is sent over the same channel 132.

Additional channels, including shown channels 133 and 134 and more if appropriate, are implemented to facilitate other request/response pairs as such requests are made. The host-based link engine 112 and the agent-based link engine facilitate the maintenance of the multi-channeled tunnel link 130 and each communications channel established therein.

In some applications, once the agent-based link engine 122 has made an initial communication to establish the multi-channeled tunnel link 130, it periodically communicates with the host server to keep the link active. In this regard, no further communications are necessarily made in any short time frame from the initial communication, with the agent system 120 ready to receive requests from the host server 110. For example, the agent system 120 may initiate a communication to the host server 110 upon power-up. Once powered-up and while the agent system 120 remains powered, it periodically sends communications to the host server 110 to keep the communications active. Once powered down, the agent system 120 is no longer ready to receive communications from the host sever 110 and re-initiates a communication after re-powering up.

Figure 2:
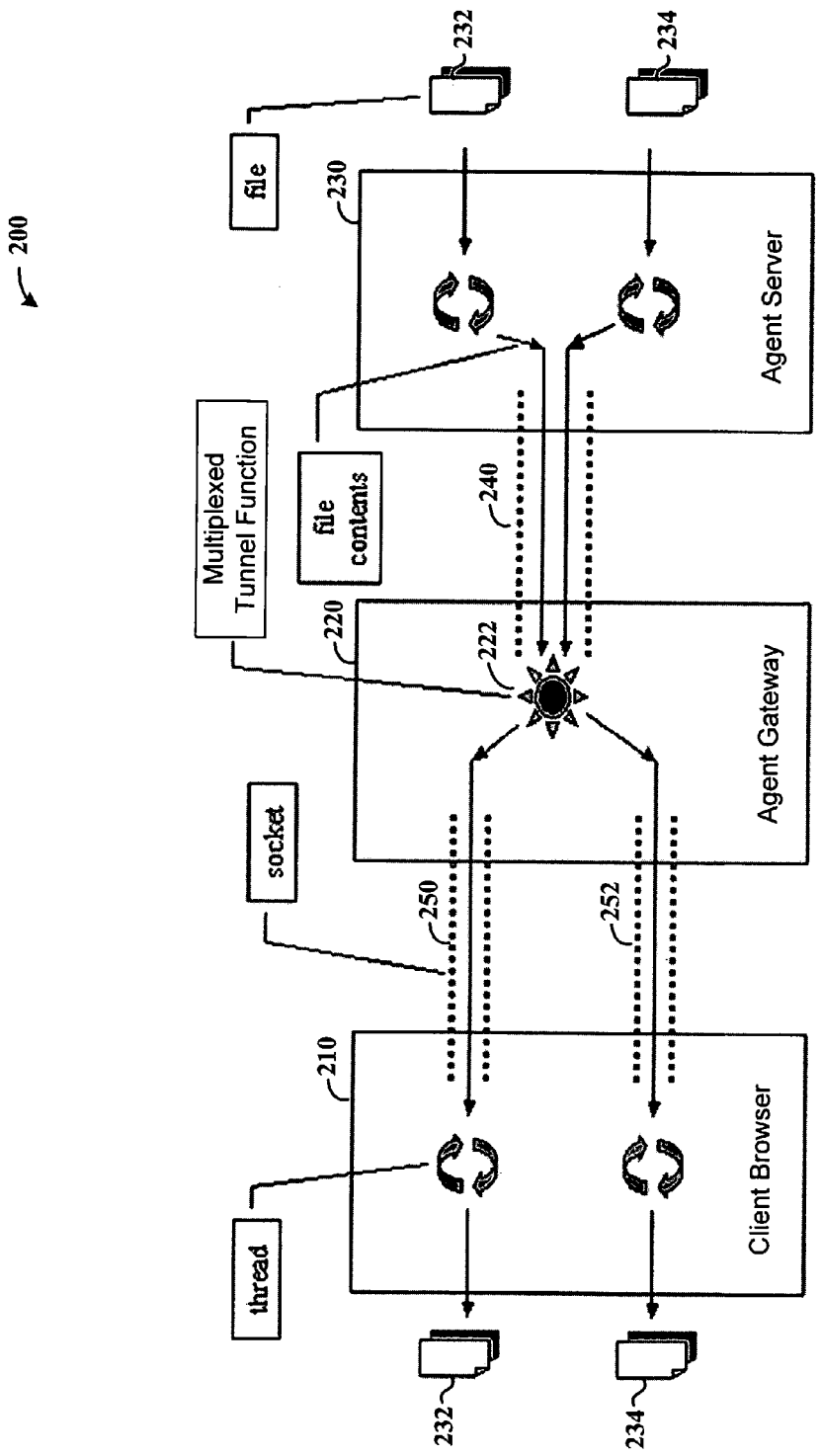
FIG. 2 shows an arrangement for routing data files from a registered user's device to a user accessing a server-hosted browser, according to another example embodiment of the present invention.

FIG. 2 shows an arrangement 200 for routing data files from a registered user's device to a user accessing a server-hosted browser, according to another example embodiment of the present invention. The arrangement includes a client browser 210, an agent gateway 220 and an agent server 230, each selectively implemented via an executable program. While amenable for use with a variety of communications, the arrangement 200 is shown implemented for communicating data files 232 and 234 between the agent server 230 and a client at the client browser 210.

The client browser 210 facilitates access to the agent gateway 220 by a remote user via communications links 250 and 252 (referenced here as socket-based communications links by way of example). The agent gateway 220 communicates with the agent server 230 over a multiplexed tunnel 240 that facilitates (tunneled) communications therebetween. The multiplexed tunnel 240 is implemented, for example, using an approach such as that described above in connection with the multi-channeled tunnel link 130 in FIG. 1.

Several channels are multiplexed over a single network connection with the multiplexed tunnel 240, using one or more of a variety of programming approaches. Such approaches are implemented as appropriate with conditions such as available equipment, available communications links, available software or user preference. For example, C++ classes can be used to implement a selected protocol. Examples below discuss the implementation of a multiplexed tunnel via C++ classes; however, these and other examples are applicable to implementation using a variety of protocols and/or different approaches to implementing a particular protocol.

The following approaches for implementing a multiplexed tunnel link and communicating information over such a link are applicable to a variety of systems and applications. These approaches may, for example, be implemented in connection with one or both of the arrangements shown in FIG. 1 and FIG. 2 (with exampled referencing FIG. 2 in the text below). In the following discussion, certain portions are characterized using terms or approaches as implemented with standard packet-communicating methods (e.g., using an HTML object model); however, the discussion is applicable to a variety of approaches in addition to those referenced by way of example below.

The protocol over which data is tunneled is implemented as follows, in connection with an example embodiment of the present invention.

Data is sent across a multiplexed tunnel connection in units called Messages, with each Message containing framing (e.g., a fixed number of binary fields), followed by the payload to be transported over the protocol. The size of the payload is variable and selected to fit the particular application. The content of the payload is considered opaque by the protocol in general instances, with one example exception discussed below in connection with the communication of commands; in this regard, the protocol is selectively used to multiplex different types of network traffic.

The framing includes the following fields, described accordingly:
1. Channel ID—signed 32 bit integer
2. Flags—unsigned 32 bit integer
3. Payload Size—unsigned 32 bit integer The following flags are present in the "flags" field:
1. First Message (first bit)
2. Last Message (second bit)

In some applications, the following fields are also included with the framing data:
1. Protocol version—identifies the version of the protocol being used
2. Size of framing fields—facilitates backwards compatibility of future protocol versions Each Message is associated with a channel in the multiplexed tunnel connection (e.g., one of channels 131-134 of FIG. 1), with the Channels identified using signed 4-byte integers (or other appropriate data set). A "first message" flag is set for the first Message for a particular communications exchange sent on a channel. The "last message" flag is set for the last message sent on the channel for the particular communications exchange. Channels are thus set up (established) or torn down (destroyed) using the first and last message flags. Where a single Message is to be sent (i.e., the single message constitutes a complete communications exchange), both the "first message" and "last message" flags are set.

Identification for each channel (Channel ID) is assigned independently by each end of the connection made by the multiplexed tunnel. For example, where a host server establishes channel in a multiplexed tunnel connection with a data source, the host server establishes the channel ID for the channel. Where the data source establishes a channel connection with the host server, the data source assigns a channel ID to the channel. Where the host server connects to multiple data sources using multiplexed tunnels for each data source, channel ID is assigned accordingly, with the host server distinguishing between channels for different multiplexed tunnels, even when the channels have the same Channel ID.

Data collisions are mitigated in one or more of a variety of manners. In one application, locally initiated channels are assigned positive channel IDs and remotely initiated channels are assigned negative channel IDs. Since "locally" and "remotely" are relative expressions, the signs of channel IDs are opposite for each connection end point (i.e., for each of two packet-communicating devices connected by a multiplexed tunnel). For instance, if endpoints A and B are coupled via a multiplexed tunnel, Channel 5 assigned by endpoint A maps to Channel -5 for endpoint B, and vice-versa. Each endpoint assigns a unique positive integer to each locally initiated channel and the sign of the channel ID field in each Message is flipped before that Message is sent across the multiplexed tunnel connection.

The Channel ID set to 0 ("zero") is a special channel that is reserved and not initiated by either endpoint coupled to a multiplexed tunnel. Channel Zero is maintained (e.g., always exists in each multiplexed tunnel connection), and is used to send special Messages called Commands. In this context, Channel Zero is used as a control channel, while other channels are "data" channels.

As discussed above, Messages sent on Channel 0 are called Commands. The payload of a Command is defined by the protocol being used. In some applications, the payload looks like this: "<COMMAND><ID>" where "COMMAND" is an instruction such as "PAUSE", "RESUME" or "ABORT," and where "ID" is a channel ID in decimal notation with or without a leading hyphen ("-") as appropriate.

Semantics for the above commands are implemented in one or more of a variety of manners. One example approach is as follows, referencing certain channels by way of example. The command "PAUSE 12" instructs the end point receiving the command to stop sending messages for Channel 12. The command "RESUME 12" instructs the end point receiving the command to resume sending messages for Channel 12, after a "PAUSE" command for channel 12 having been previously sent. The "ABORT -4" command informs the end point receiving the command that Channel "-4" is no longer viable and must be discontinued. The command "SHUTDOWN" informs the end point receiving the command that the entire multiplexed tunnel connection (via which the command is sent) needs to be torn down, with any existing channels aborted.

As discussed above, the multiplexed tunnel approach can be implemented with several C++ classes. The following describes examples of implementation with these classes.

A CMessage class is a light class wrapping a portion of heap-resident data. A CMessage is built using, for example, a CMessageBuilder, or by creating the object using the new operator with the default constructor, setting the framing fields with the appropriate set*( ) methods, and adding the payload using the appendData( ) method. A CMessageBuilder function decodes incoming raw data and parses it into its constituent Messages, encapsulating each as a CMessage object. The CMessage "getters" and "setters" know and enforce the offsets of the framing fields and their types.

CMultiTunnel is an abstraction in the implementation of the multiplexed tunnel approach. It's interface is divided into parts (sides) including "channels" and "transport". The "transport" side is used by code that implements the connection from one end point to another end point. The "channels" side is used by code that integrates the MultiTunnel with the rest of the application. Function on the "channels" side is channel-specific (i.e., specific to a channel established in a multiplexed tunnel as discussed above), and on the "transport" side is generally not channel-specific. Additionally, on the "channels" side, the concepts of pausing, resuming and aborting a channel as discussed above are present as function calls, while on the "transport" side these concepts are absent (with the exception of "abort").

When implementing code that interacts with the multiplexed tunnel within the context of the CMultiTunnel's "transport" (e.g., using a TCP socket), a virtual pointer is provided, which points to the CMultiTunnel's constructor that is of type CTransportObserver. A CTransportObserver has two pure virtual methods, called:

on TransportMessageAvailable(CMultiTunnel *, CMessage *), and
 on ChannelAborted(int32 channelId).

Generally, on TransportMessageAvailable( ) is implemented by appending the message to some sort of queue, where messages in the queue are eventually written to a socket. The CMultiTunnel parameter facilitates a single object acting as the CTransportObserver for more than one CMultiTunnel.

The method on ChannelAborted( ) is selectively implemented to facilitate efficiency where appropriate. For instance, if the CTransportObserver has a queue of CMessage objects waiting to be written to a socket and on ChannelAborted( ) is called, CMessage objects, with the particular (related) Channel ID value, can be deleted before being sent. An "abort" command propagates to the other end point as a Command on Channel Zero.

When data is read from the socket by the "transport" code, it should be fed to a CMessageBuilder object. When the CMessageBuilder object has one or more CMessage objects available, the "transport" code provides those objects to the CMultiTunnel by calling the CMultiTunnel::sendTransportMessage( ) method. The CMultiTunnel assumes ownership of the CMessage and processes it appropriately.

In some applications, the "transport" code selectively uses the pauseLocalChannel( ) and resumeLocalChannel( ) methods to request that specific channels temporarily cease producing messages. For example, if data cannot be written to the socket as quickly as it is produced by the various channels in aggregate, the "transport" code's outgoing message queue will increase without bound. To mitigate this situation, the "transport" code requests that the offending channel or channels cease producing messages, and asks them to resume when the queue has been reduced to a manageable size. From the channel's perspective, this corresponds to receiving a "PAUSE" command from the other end point, followed by a "RESUME" command as discussed above.

When implementing code that interacts with the CMultiTunnel abstraction in the context of a particular channel, an object that implements the abstract interface of CChannelObserver is provided. CChannelObserver includes the following pure virtual methods:

on ChannelMessageAvailable(CMultiTunnel *, CMessage *),
 on ChannelPaused(CMultiTunnel *, int32),
 on ChannelResumed(CMultiTunnel *, int32), and
 on ChannelAborted(CMultiTunnel *, int32).

These methods include a pointer to the CMultiTunnel object as well as the channel ID as parameters, so a particular CChannelObserver can exist per channel, per tunnel or serve many tunnels. The methods for pausing, resuming and aborting channels are called when the CMultiTunnel receives the corresponding Commands on Channel Zero. The on ChannelMessageAvailable( ) transfers ownership of an incoming CMessage from the CMultiTunnel to the CChannelObserver.

Calls to the observer's on ChannelPaused( ) and on ChannelResumed( ) generally facilitate a request that the production of messages be halted and subsequently restarted. In some applications, there is no actual enforcement of these requests in the implementation; such enforcement is carried out by the application-specific "channel" code. In some applications, the "channel" code responds to receiving overlapping "pause" requests from different sources by, and should therefore keep track of a pausing "depth" and only resume message production when there have been sufficient calls to on ChannelResumed( ) to return that depth to 0 ("zero").

The "channels" code calls the following methods in the CMultiTunnel class:

sendChannelMessage(CMessage *),
 pauseRemoteChannel(int32),
 resumeRemoteChannel(int32), and
 abortChannel(int32).

CMultiTunnel::sendChannelMessage( ) transfers ownership of the CMessage object from the "channels" code to the CMultiTunnel. PauseRemoteChannel( ) and resumeRemoteChannel( ) send requests to pause/resume a particular channel to an opposing endpoint (whereat, the requests are implemented as calls to some CChannelObserver's on ChannelPaused( ) and on ChannelResumed( ) methods). The method abortChannel( ) is used to process error connections, such as for correcting I/O errors.

Channel initiation is carried out at an endpoint coupled to the multi-channel tunnel. The CMultiTunnel constructor is provided with a virtual pointer to a CChannelObserverFactory object. CChannelObserverFactory has a single pure virtual method: buildChannelObserver( ) which takes a channel ID and returns a CChannelObserver. The CMultiTunnel uses the CChannelObserverFactory to build a CChannelObserver each time a channel is remotely initiated. That is, when a message arrives with an unknown channel ID and the message has its "first message" flag set, the CMultiTunnel uses the factory to build a new CChannelObserver and immediately calls that object's on ChannelMessageAvailable( ) method.

To initiate a channel locally, the "channels" code calls the method CMultiTunnel::initiateChannel( ). This methods takes a CChannelObserver as a parameter and returns a channel ID. The channel ID returned is then valid, and CMultiTunnel::sendChannelMessage( ) can then be used to send messages on that channel.

A channel is torn down when either a CMessage with the "last message" flag is sent or received, or when the channel is aborted (remotely or locally). Channel shutdown is carried out with a CMultiTunnel shutdowns method. Calling this method is equivalent to calling abortChannel( ) for each existing channel. After calling this method, it is safe to destroy the CMultiTunnel object and close the associated socket.

A variety of threads are implemented to suit particular applications. In general, CMultiTunnel does not have threads of its own. In this regard, a call to CMultiTunnel::sendTransportMessage( ) will generate a call to CChannelObserver::on ChannelMessageAvailable( ), on the same thread. In this regard, CChannelObserver::on ChannelMessageAvailable( ) is selectively set to not undertake a synchronous I/O operation before returning, to mitigate any slowdown in the data transfer rate for other channels on the particular multiplexed tunnel.

For protocol validation, CMultiTunnel inspects each CMessage passed to it and validates it to a degree. When a CMessage validation fails, it is deleted and an error message is printed to standard out. For example, if a CMessage's channel ID is not recognized and its "is first" flag is not set, it fails validation.

CTransportQueue provides a convenient implementation of a queue of outgoing messages for the "transport" code. CTransportQueue has selective features including thread-safe features, tracking of how many messages are in the queue for each channel, deletion of all the messages with a given channel, and automatically priority assignment to messages on Channel Zero. In other applications, CTransportQueue also tracks how much total payload (in bytes) each channel has in the queue, as opposed to the number of CMessage objects. In certain applications, more sophisticated QOS schemes are implemented in CTransportQueue.

As discussed above, some or all of the approaches described hereinabove can be selectively implemented with FIG. 2. The following examples describe such applications. Three executable functions include a client, gateway and server, respectively implemented with the client browser 210, agent gateway 220 and agent server 230 as shown in FIG. 2.

In some applications, a file-request protocol is implemented with the executable functions as follows. Requests include the name of a file followed by a terminating NULL character. Responses include the contents of the named file. When the contents of the named file have all been written, the connection is closed.

The Client takes any number of command-line arguments. Each command-line argument is assumed to be a file name. The client creates a thread for each file name, and each thread opens a socket to the gateway by using a certain port on a local host. When the connection is established, the client communicates the file-request protocol over the connection by writing the name of the file plus a terminating null character, and then reading the contents of the file back. The file contents are written to disk in the local directory in a new file with the appropriate file name. When the connection is closed, the file is closed and the thread exits. When all the threads exit, the Client exits.

The Server opens a connection to the Gateway, using a certain port on the local host (different from the client's port). The Server and Gateway speak to each other over this connection using the MultiTunnel protocol. The Server does not initiate any channels on this connection, but responds to remotely initiated channels. When a channel is initiated remotely, the Server starts a new thread called a File Getter. The File Getter handles all reads and writes on that channel. The File Getter reads the name of the file from the channel, opens the file with that name in the local directory, writes the file contents to the channel, and closes the channel.

Figure 3:
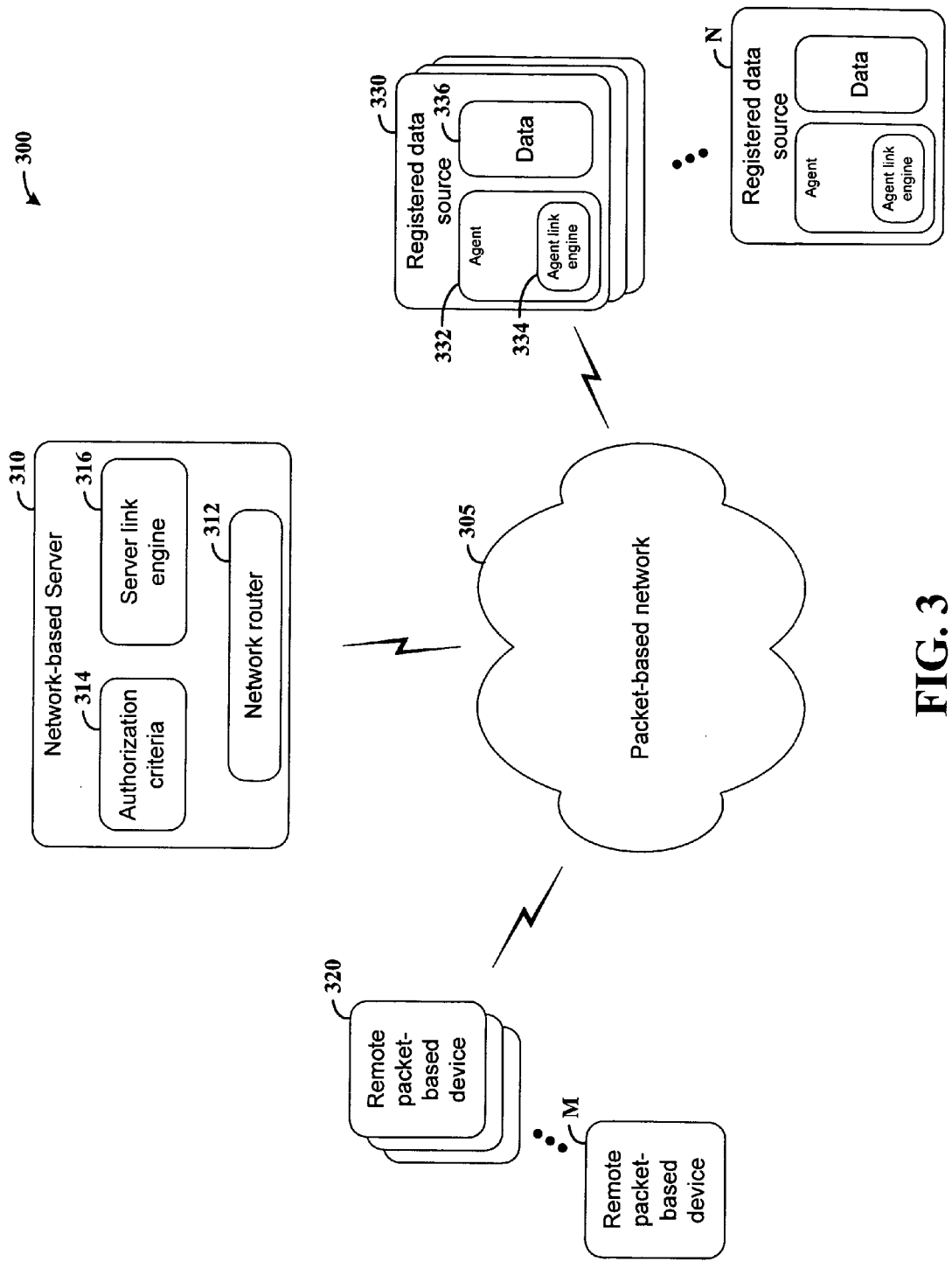
FIG. 3 is a system for providing access to and routing data between a registered user's data source and a remote packet-communicating device, according to another example embodiment of the present invention.

FIG. 3 shows a system 300 for providing access to and routing data between registered user data sources and remote packet-communicating devices over a multiplexed communications link, according to another example embodiment of the present invention. The system 300 includes a network-based server 310, a plurality of remote packet-based devices 320-M and a plurality of registered data sources 330-N, all of which communicate via a packet-based network 305. The remote packet-based devices include, for example, a mobile telephone, a personal computer (PC), digital media device such as an MP3 player or video player, automobile entertainment system or personal data assistant (PDA) device. The registered data sources 330-N include devices such as those mentioned with the remote packet-based devices, and generally access data that is desirably accessed by a remote packet-based device (e.g., as a registered user's home PC bearing data files or media that the user wishes to remotely access). The network 305 includes one or more packet-based networks such as the Internet and, where appropriate, other networks such as a mobile telephone network or a local area network (LAN). In some applications, the network 305 is a local area network implemented for a locality such as a home or business. In other applications, the network 305 is or includes a virtual network or set of virtual application communication channels within a processor or group of processors associated with a computing appliance.

The network-based server 310 includes a server link engine 316 that facilitates a multiplexed communication link with registered data sources, and a network router 312 that interacts with each registered data source via the multiplexed communications link. Authorization criteria 314 is used to authorize data requests from remote packet based devices. The server link engine 316 and network router 312 are implemented using, for example, a processor at the network-based server 310 that uses software programming to carry out the respective functions.

Each of the registered data sources 330-N includes an agent 332 that processes communications received from the network router 312 and facilitates the communication of data 336 in response to requests. An agent link engine 334 facilitates the multiplexed communications link with the server link engine 316. The agent link engine 334 is selectively implemented with the agent 332 (e.g., as software implemented by a processor at the registered data source 330).

Multiplexed communications links are established between the network-based server 310 and each registered data source using one or more of the approaches described herein, such as those shown in and described in connection with FIG. 1 and/or FIG. 2. In general, the agent link engine 334 initiates a communication with the network-based server to establish a communications link; in return, the network-based server uses the initial communication to communicate back to the registered data source 330 (e.g., where the registered data source is not necessarily publicly addressable via a network address). Such a communication link employs a communications protocol such as a those implemented with the Internet.

In some applications, the agent link engine 334 automatically initiates the communications link upon startup, upon connecting to the packet-based network 305 or other condition. In other applications, the agent link engine 334 initiates the communications link in response to user-action at the registered data source 330.

Once an initial communications link is established, the server link engine 316 and the agent link engine 334 facilitate the communication of data, commands or other information over the link, with each communication sequence (e.g., data stream) communicated over a logical channel in the communications link.

A control channel is established within the communications link, with control data embedded in a protocol appropriate for the communications link and indicating that the data belongs to the control channel (e.g., by predefining a channel ID for the control channel). The control channel is maintained while the communications link is active. When data is to be transferred, a new channel ID is associated with a particular data transfer (request) and used to identify data sent over the communications link as belonging to that particular channel ID and, accordingly, to a particular data transfer set. For instance, where requested data is transferred via a stream of packets, each packet includes protocol information that allows the packet to be appropriately transferred, together with information that identifies the data as belonging to the particular channel ID, as well as the data itself.

Data is transferred via the system 300 in one or more of a variety of manners. The following example approach involves remote user access to data at a registered data source. When a user at a remote packet-based device 320 wishes to access data 336 at the registered data source 330, he or she accesses a web page hosted by the network-based server 310. At the web page, the user enters in authorization information that is presented to the network-based server 310. In response, the network-based server uses the authorization criteria 314 with the provided authorization information to either authorize or deny the user access to the registered data source 330. In some applications, this authorization is selective based upon the type of data requested by the user.

Once authorized, a data request initiated by the user at the remote packet-based device 320 is processed by the network-based server 310. Using the communications link, the server link engine 316 sends a data request in a packet-based communication embedded with a protocol appropriate for the communications link. The data request specifies a channel identification (ID) and indicates that it is a first communication for the particular channel. The network router 312 uses the established channel via the server link engine 316 to send information to the registered data source 330 that identifies the requested data to be provided, either with the first communication or with a subsequent communication.

When the agent 332 receives the first communication, it acknowledges the communication and the particular channel ID, and responds to the data request by initiating a data stream over the established channel. In general, the data is embedded with the protocol for the communications link and includes the established channel ID, and is sent to the network-based server in packets. When the requested data has been transferred, the agent link engine 332 includes, with the last data communicated or with a separate communication, an indicator that the transfer is complete.

The network-based server 310 receives the data sent from the registered data source 330 and passes that data to the remote packet-based device 320 using one or more of a variety of communications approaches. In response to receiving the indicator that the transfer is complete at the network-based server 310, the server link engine 316 terminates the established channel. Such termination may involve, for example, setting data at the network-based server to indicate that the particular channel ID is open and/or removing data characterizing the particular channel as associated with the data request received from the remote packet-based device 320.

The above-discussed data transfer approach is facilitated over the identified channel while also using additional channels (having a distinct channel ID) on the communications link for passing embedded communications to facilitate data requests or for other approaches, with the additional channels being active and/or implemented concurrently with or independently from the use of the above-discussed channel. In this regard, two or more communications streams can be passed over the communications link while ensuring that the data received in the communications streams is associated with the appropriate request or command.

The system 300 is implemented in a variety of manners, depending upon the application. For general information regarding data transfer, and for specific information regarding approaches to data transfer that are selectively implemented via a multiplexed communications link in accordance with one or more example embodiments, reference may be made to U.S. patent application Ser. No. 11/056,345 entitled "Network-distributed Data Routing," filed Feb. 11, 2005 and fully incorporated herein by reference.

The system 300 is adapted to work in a variety of environments involving disparate networks, data source devices, remote packet-communicating devices, data and characteristics thereof. One particular use-case scenario involves remote data access as follows. When a particular user who is party to the registered data source 330 (e.g., a homeowner having media content stored at his or her home computer) wishes to establish remote access, the user signs up for a service provided via the network-based server 310. The network-based server 310 prompts the user for access information to the user's registered data source 330 so that the host application router 312 can interact with the registered data source. This access information (e.g., user names, passwords, access restrictions) is stored with authorization criteria 314. Once registered, the registered data source 330 establishes a persistent communications link with the network-based server 310 as discussed above. Once the communications link is established, a user at one of the remote packet-based devices 320-M can request and receive data from the registered data source 330 with appropriate authorization and data transfer control, also as discussed above.

Figure 4:
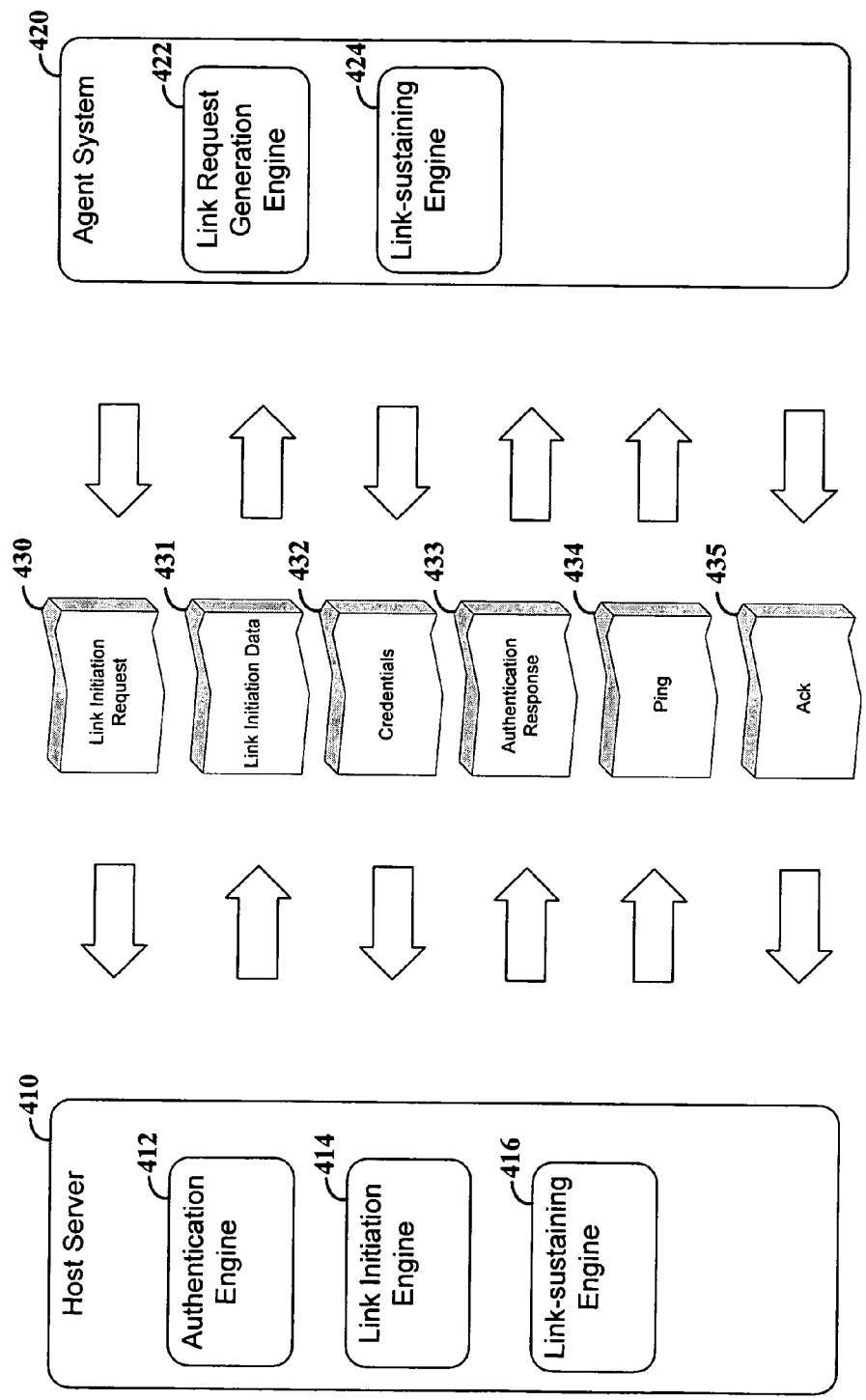
FIG. 4 shows an arrangement and approach to facilitating a multi-channel tunneled communications link over a packet-based network, according another example embodiment of the present invention.

FIG. 4 shows an arrangement and approach to establishing a multi-channel tunneled communications link over a packet-based network, according another example embodiment of the present invention. The arrangement in FIG. 4 may be implemented in connection with and/or otherwise using one of more of the approaches discussed in connection with the figures above.

A host server 410 includes an authentication engine 412, a link initiation engine 414 and a link-sustaining engine 416. The host server 410 interacts with one or more of a plurality of agent systems including agent system 420, for establishing a communications link therebetween. Agent system 420 includes a link request generation engine 422 and a link-sustaining engine 242.

When the agent system 420 wishes to establish a multi-channel tunneled communications link with the host server 410, the link request generation engine 422 sends a link initiation request 430. The link request generation engine 422 initiates the establishment of the multi-channel tunneled communications link under one or more of a variety of conditions. In some applications, the link request generation engine 422 automatically sends the link initiation request 430 upon power-up of the agent system 420 and/or upon connection of the agent system to a packet-communicating network via which the host server 410 is available. The link request generation engine 422 may also send the link initiation request 430 at the direction of a user at the agent system 420, or at the direction of a programmed application at the agent system 420.

When the link initiation request 430 is received at the host server 410, the link initiation engine 414 responds by sending link initiation data 431 back to the agent system 420. The link initiation data 431 includes information sufficient for facilitating the initiation of a multi-channel tunneled communications link, such as described above and used in connection with CMultiTunnel constructor and the arrangement shown in FIG. 2.

The agent system 420 responds by sending credentials 432, such as authentication information including a user name, password, a combination thereof or other authentication information. The agent system 420 replies with authentication information in an authentication response 433, which is processed by the authentication engine 412. If the agent system 420 is authenticated, the establishment of the link continues. If the agent system 420 is not authenticated, the link is not established.

When the agent system 420 has been authenticated by the authentication engine 412, further communications with the agent system 420 are authorized and sent as appropriate. To maintain the link as active (for example, during time periods when no messages are sent over the link), the host server link-sustaining engine 416 sends a ping 434 to the agent system 420. The agent link-sustaining engine 424 responds to the ping 434 by sending an Ack 435 back to the host server 410. In some applications, the agent system 420 shuts down the link when a certain time period has passed without receiving a communication from the host server 410, be that a message or a ping 434. Similarly, the host server 410 selectively shuts down the link when a ping 434 is sent but an ack 435 is not received from the agent system 420 in response thereto.

Figure 5:
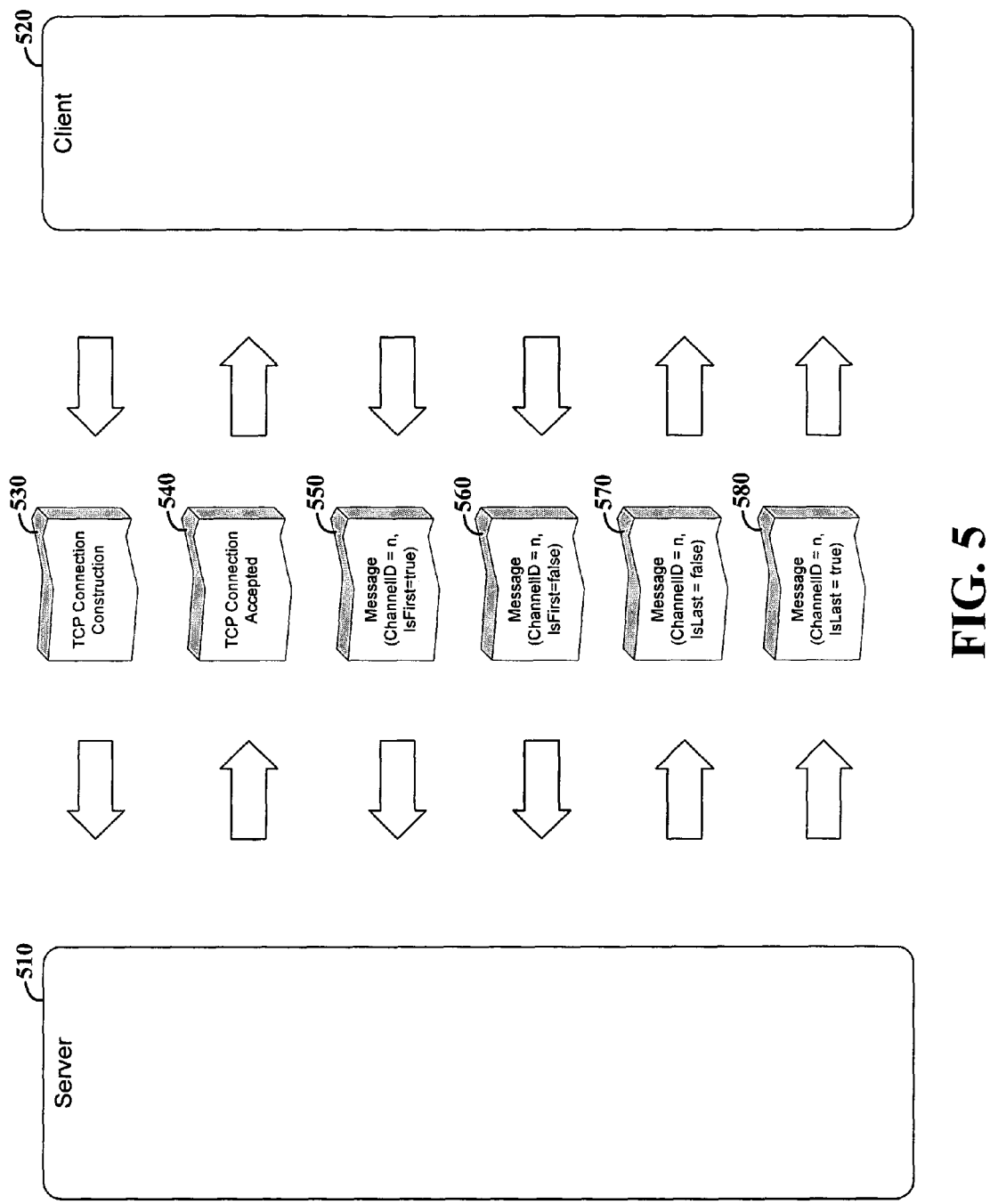
FIG. 5 shows an arrangement and approach to constructing and destructing a multi-channel tunneled communications link over a packet-based network, according another example embodiment of the present invention.

FIG. 5 shows an arrangement and approach to constructing and destructing a multi-channel tunneled communications link over a packet-based network, according another example embodiment of the present invention. In a manner similar to that shown in FIG. 4, FIG. 5 shows a server 510 that communicates with one or more clients, with a single client 520 shown for brevity.

When the client 520 (e.g., a user's PC) is to establish a communications link, TCP connection construction data 530 is sent to the server 510. The server 510 responds with TCP connection accepted data 540. When a message is to be sent over the established connection by the client 520, it sends a first message 550, including a Channel ID and having the IsFirst flag set to true in order to indicate that the message is the first message. The Channel ID is set to a particular integer n for the client 520, and is reversed in sign to negative n (−n) for the server 510; this channel is reserved for this particular set of messages until the channel is destroyed.

Once the first message 550 has been sent, a additional message 560 with the channel ID "n" and IsFirst flag set to false can be sent, with the server 510 responding with message 570, identifying the channel ID "n" and having an IsLast flag sent to false. Multiple such messages can be sent. When the particular set of messages is complete, or when the communications are terminated for another reason, the server 510 sends message 580 with the channel ID and having the IsLast flag set to true, thereby destructing the channel "n."

Figure 6:
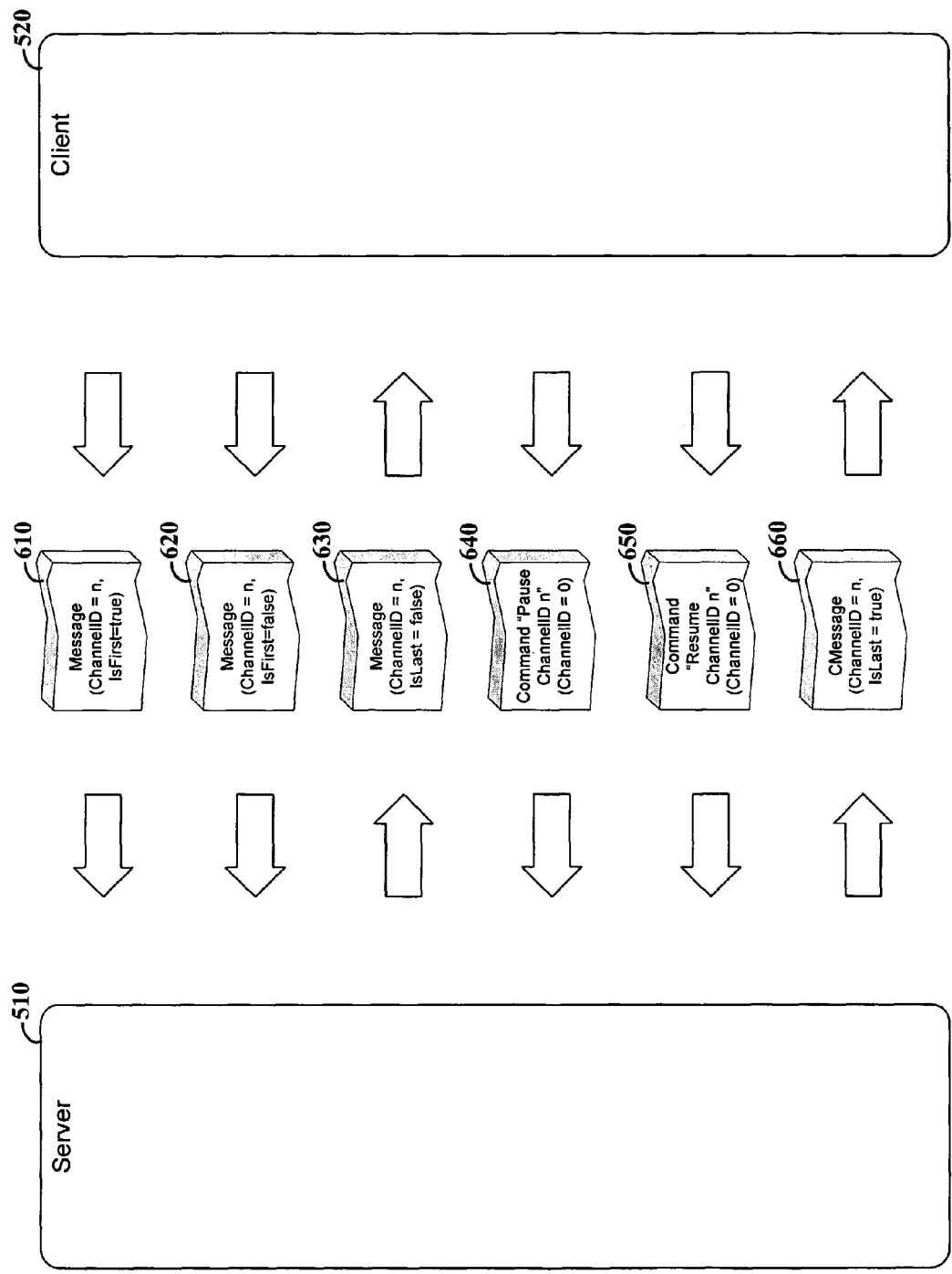
FIG. 6 shows an arrangement and approach to controlling flow over a multi-channel tunneled communications link over a packet-based network, according another example embodiment of the present invention.

FIG. 6 shows an arrangement and approach to controlling flow over a multi-channel tunneled communications link over a packet-based network, according another example embodiment of the present invention. The arrangement in FIG. 6 is similar to that shown in FIG. 5 and accordingly the server and client are respectively numbered consistently with FIG. 5.

The client 520 sends message 610 to establish a message communication and thus indicates a channel ID "n" and has its IsFirst flag set to true, as with message 550 in FIG. 5. Response messages 620 and 630 are sent from the server 510, each identifying the channel ID and having its IsLast flag set to "false" as with the message 570 in FIG. 5.

When the client 520 wishes to interrupt flow, it sends a pause command 640 indicating that the particular channel having channel ID "n" is to be paused. This pause command 640 is sent on a channel zero (channel ID "0"), implemented as discussed above for controlling flow. The server 510 responds by pausing communication of further messages on channel "n."

When the client 520 wants to resume communications it sends a resume command 650 specifying channel ID "n" and, as with the pause command 640, sent over channel zero. Once the server 510 receives the resume command 650, it continues with appropriate messages until a last message 660 is to be sent, and appropriately sets the IsLast flag to true, as with message 580 in FIG. 5.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, the specific communications terms, processes and orders (e.g., as described with FIG. 2 and/or FIGS. 4-6) are selectively modified, in many applications to facilitate a similar function. Such modifications and changes do not depart from the true spirit and scope of the present invention that is set forth in the following claims.

What is claimed is:

1. A method comprising:
   at a first one of two packet-communicating devices, initiating a communications link over a packet-based network with a second one of the packet-communicating devices using a packet-based communications protocol and therein establishing a control communications channel with a control channel identifier;
   establishing a data communications channel in the communications link by
      at one of the first and second packet-communicating devices, sending a first communication over the communications link, the first communication being embedded in the packet-based communications protocol and indicating that a channel is to be established,
      receiving the first communication at the other of the first and second packet-communicating devices, and
      specifying a unique channel identifier for the indicated channel to be established;
   using the established data communications channel to pass data by embedding the data, together with information identifying the specified unique channel identifier, within the packet-based communications protocol, and passing the embedded data over the communications link;

terminating the established data communications channel by passing a channel termination command embedded with the packet-based communications protocol and identifying the specified channel identifier; and using the control communications channel to pass control commands between the at least one of the first and second packet-communicating devices by embedding the control commands with the packet-based communications protocol and identifying the control channel identifier therein, wherein the control commands comprise a pause command to pause messages being sent via the established communications channel, a resume command to resume messages being sent after the pause command, and a shutdown command to shut-down a single transport control protocol connection including the control communications channel and the established data communications channel.

2. The method of claim 1, wherein the packet-based communications protocol comprises a single transport control protocol connection including the control communications channel with the control identifier and the established communications channel with the unique channel identifier, and wherein initiating a communications link includes forwarding a local connection at the first packet-communicating device to the second packet-communicating device.

3. The method of claim 1, wherein establishing a data communications channel includes establishing two of said data communications channels.

4. The method of claim 3, wherein establishing two of said data communications channels includes establishing two data communications channels that coexist.

5. The method of claim 3, wherein establishing two of said data communications channels includes establishing a second data communications channel after a first data communications channel has been terminated.

6. The method of claim 3, further comprising using the two data communications channels to pass separate data streams.

7. The method of claim 1, further comprising, after the communications link has been established:

sending an acknowledgement request from one of the packet-communicating devices to the other one of the packet-communicating devices;

maintaining the communications link in response to receiving an acknowledgement response to the acknowledgement request from the other one of the packet-communicating devices; and terminating the communications link in response to not receiving an acknowledgement response to the acknowledgement request from the other one of the packet-communicating devices within a selected amount of time.

8. The method of claim 1, wherein the first packet-communicating device is not publicly addressable via the packet-based network.

9. The method of claim 1, wherein initiating a communications link at a first one of the packet-communicating devices includes programming the first packet-communicating device to automatically initiate the communications link upon a condition.

10. The method of claim 9, wherein programming the first packet-communicating device includes programming the first packet communicating device to automatically initiate the communications link in response to at least one of a power-up condition and a packet-based network connectivity condition of the packet-communicating device.

11. The method of claim 1, further including pausing the passing of data over a particular channel in response to a pause command received via the control communications channel, and resuming the passing of data over the particular channel in response to a resume command received via the control communications channel.

12. The method of claim 11, further comprising selectively pausing and resuming the communication of data over a communications channel in response to a condition of communications congestion on the communications link.

13. The method of claim 11, further comprising selectively pausing and resuming the communication of data over a communications channel in response to a priority associated with a particular data transfer channel to facilitate the priority transfer of data over a higher priority channel, relative to the transfer of data over a lower priority channel.

14. A system comprising:

at least two packet-communicating devices that communicate over a packet-based network;

a communication link engine at each packet-communicating device, the communication line engines adapted to facilitate communications by at a first one of the packet-communicating devices, initiating a communications link with a second one of the packet-communicating devices using a packet-based communications protocol and therein establishing a control communications channel with a control channel identifier, and establishing a data communications channel in the communications link by at one of the first and second packet-communicating devices, sending a first communication over the communications link, the first communication being embedded in the packet-based communications protocol and indicating that a channel is to be established, receiving the first communication at the other of the first and second packet-communicating devices, and specifying a unique channel identifier for the indicated channel to be established;

wherein the first and second packet-communicating devices use the established data communications channel to pass data by embedding the data, together with information identifying the specified unique channel identifier, within the packet-based communications protocol, and passing the embedded data over the communications link and the first and second packet-communicating devices use the control communications channel to pass control commands between the first and second packet-communicating devices by embedding the control commands with the packet-based communications protocol and identifying the control channel identifier therein, wherein the control commands comprise a pause command to pause messages being sent via the established communications channel, a resume command to resume messages being sent after the pause command, and a shutdown command to shut-down a single transport control protocol connection including the control communications channel and the established data communications channel; and wherein the communications link engines are adapted to terminate the established data communications channel by passing a channel termination command embedded with the packet-based communications protocol and identifying the specified channel identifier.

15. The system of claim 14, wherein the communications link engines are adapted to establish two of said data communications channels and wherein the first and second packet-communicating devices concurrently pass data over the two data communications channels.

16. The system of claim 14, wherein at least one of the communications link engines in the first and second packet-communicating devices is adapted to
   send an acknowledgement request to the communications link engine at the other one of the packet-communicating devices;
   maintain the communications link in response to receiving an acknowledgement response to the acknowledgement request; and
   terminate the communications link in response to not receiving an acknowledgement response to the acknowledgement within a selected amount of time.

17. The system of claim 14, wherein the first packet-communicating device is programmed to automatically initiate the communications link upon a condition.

18. The system of claim 17, wherein the first packet-communicating device is programmed to automatically initiate the communications link in response to at least one of a power-up condition and a packet-based network connectivity condition of the packet-communicating device.

19. The system of claim 14, wherein the communication link engines are adapted to pause the passing of data over a particular channel in response to a pause command received via the control communications channel, and to resume the passing of data over the particular channel in response to a resume command received via the control communications channel.

* * * * *